J. G. ORTH & W. WESTON.
OIL TANK.
APPLICATION FILED JULY 26, 1910.
994,333.
Patented June 6, 1911.
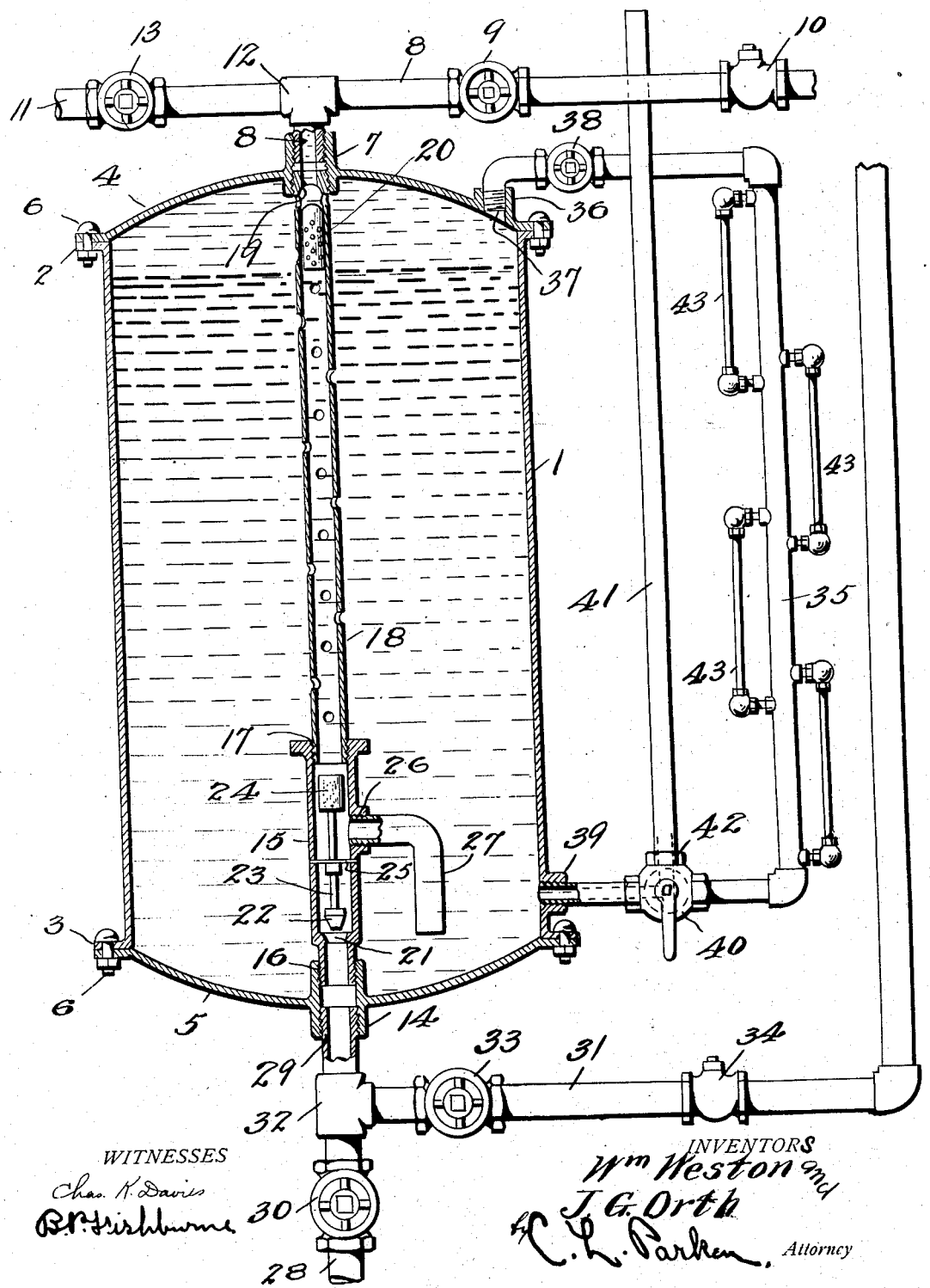
WITNESSES
Chas. K. Davis
B. F. Fishburne
INVENTORS
Wm Weston and
J. G. Orth
C. L. Parker, Attorney

UNITED STATES PATENT OFFICE.

JOHN G. ORTH AND WILLIAM WESTON, OF LOS ANGELES, CALIFORNIA.

OIL-TANK.

994,333.

Specification of Letters Patent. Patented June 6, 1911.

Application filed July 26, 1910. Serial No. 573,976.

*To all whom it may concern:*

Be it known that we, JOHN G. ORTH and WILLIAM WESTON, citizens of the United States, residing at Los Angeles, in the county of Los Angeles and State of California, have invented certain new and useful Improvements in Oil-Tanks, of which the following is a specification.

Our invention relates to apparatus for storing and withdrawing hydrocarbons or analogous volatile fluids.

An important object of this invention is to provide apparatus of the above character, wherein the hydrocarbon or oil may be stored at a constant pressure and with the exclusion of air.

A further object of this invention is to provide an apparatus for storing oil, or the like, together with a heavier liquid, said apparatus being provided with valves for preventing the heavier liquid from being withdrawn from the apparatus with the oil.

A further object of our invention is to improve the construction in general of such apparatus, and simplify the same, whereby its cost of manufacturing is reduced.

Other objects and advantages of this invention will be apparent hereinafter.

In the drawing forming a part of this specification, the figure is a central vertical section through the apparatus.

In the drawing wherein is illustrated a preferred embodiment of our invention, the numeral 1 designates a cylindrical casing forming the body portion of a storage tank. This cylindrical casing has its upper and lower ends provided with outwardly extending annular flanges 2 and 3, respectively, upon which are seated heads 4 and 5. These heads are bolted to the flanges 2 and 3, as shown at 6. The head 4 is provided at its center with a vertically disposed and internally screw threaded nipple 7, within which is disposed one end of a draw-off pipe 8, having a cut-off valve 9 and a check valve 10, for controlling the same. The pipe 8 may be connected with the receptacle (not shown) which is to be filled with oil. The pipe 8 has an oil supply pipe 11 connected therewith, as shown at 12, and this oil supply pipe is provided with a cut-off valve 13. The head 5 is provided centrally thereof with a vertically disposed and internally screw threaded nipple 14, one end of which receives the reduced screw threaded end of a cylindrical valve casing 15, as shown at 16.

This valve casing is vertically disposed and has its upper end internally screw threaded, as shown at 17, for the reception of the lower screw threaded end of a perforated vertically disposed pipe 18, which has its upper screw threaded end disposed within the lower portion of the nipple 7. The upper end of the perforated pipe 18 is in registration with the adjacent end of the pipe 8, as shown. The upper portion of the pipe 18 is provided with a valve seat 19, adapted to be engaged by a float-valve 20, having such specific gravity that the same will sink in oil and float in water. It is obvious that when the float-valve 20 engages the valve seat 19, communication is cut off between the storage tank and the pipe 8. The valve casing 15 is provided with a valve seat 21 to be engaged by a valve-head 22 having rigid connection with a reciprocatory stem 23, which is connected with a float 24. The valve stem 23 is disposed axially within the valve casing 15 and is guided in its movement by a bracket 25. The valve casing 15 is provided upon one side thereof and intermediate of its ends, with an internally screw threaded nipple 26, which receives the screw threaded end of a pipe 27. This pipe 27 is bent at its center to form horizontal and vertical portions, said vertical portion being adapted to discharge its contents downwardly against the head 5. A water draw-off pipe 28 has its screw threaded end 29 arranged within the lower portion of the nipple 14, as shown, and this pipe is provided with a cut-off valve 30. A water supply pipe 31 has communication with pipe 28 between the valve 30 and the head 5, as shown at 32. This water supply pipe is provided with cut-off and check valves 33 and 34 respectively. The pipe 31 is preferably extended vertically for communication with a suitably elevated water tank, (not shown).

For the purpose of ascertaining the amounts of oil and water in the storage tank, a substantially U-shaped pipe 35 is provided, the upper horizontal portion of which is connected with a nipple 36 formed upon the head 4, as shown at 37. This horizontal portion of the U-shaped pipe is provided with a cut-off valve 38. The lower horizontal portion of the pipe 35, has suitable connection with a nipple 39 formed upon the lower portion of the cylindrical casing 1. This lower horizontal portion of the pipe 35, is provided at a point equi-distant of its ends with a three-way valve 40. This three-way valve is provided with a vertically disposed pressure relief pipe 41, as shown at 42. It is to be understood that the three-way valve 40 may be operated to alternately establish communication between the pressure relief pipe 41 and the tank and the vertical portion of the pipe 35 and said tank. The vertical portion of the pipe 35 is provided with a plurality of glass tubes 43, which are arranged and connected with said vertical portion, as shown. These glass tubes indicate the amounts of oil and water within the storage tank.

In the use of our apparatus, the valve 38 is normally closed and the three-way valve 40 operated to establish communication between the storage tank and the pressure relief pipe 41. Assuming that all other valves are closed, the valves 13 and 33 are opened and the water is fed into the lower portion of the valve casing 15 and unseats the valve-head 22. As the water rises in the storage tank, the float 24 retains said valve-head unseated and thus permits of the free passage of the water through the same to be discharged from the pipe 27. The air in the storage tank is forced out of the same by the water and discharged through the pipe 11. The valve 33 remains open until the storage tank has been completely filled with the water and the float-valve 20 elevated to engage its seat 19. The operator then connects the oil supply pipe 11 with the receptacle (not shown) containing the oil, and opens the valve 30, whereby the water is discharged through the pipe 28 and oil is drawn through pipe 11 into the storage tank, to fill the space vacated by said water, it being understood that the float-valve 20 follows the level of the water. As the water is being discharged from the storage tank, the float-valve 20 travels downwardly within the perforated pipe 18 and finally engages float 24 and forces valve-head 22 upon its seat, whereby the discharge of the water from the tank is stopped. It is thus seen that it is impossible for any of the oil introduced into the storage tank to be discharged through the pipe 28. The storage tank having thus been completely filled with oil and water, valves 13 and 30 are closed and valve 33 is again opened. If it is desired to withdraw the oil from the storage tank through the pipe 8, valve 9 is opened and the water will rise in said storage tank and force the oil through said pipe 8. It is obvious that the float-valve 20 will prevent any of the water from being discharged through said pipe 8 together with the oil. The check valve 10 prevents the return of the oil into the storage tank through the pipe 8, and also prevents air from entering the storage tank. The valve 9 may now be closed and the oil and water will be stored at a constant pressure. Should these liquids expand owing to their increase in temperature, the water will be free to flow into the pressure relief pipe 41, whereby the pressure within the storage tank is kept constant. By the employment of check valve 34, the water is prevented from flowing back beyond the same. By proper operation of valves 38 and 40, communication may be established between the storage tank and the vertical portion of the U-shaped pipe 35, whereby the amounts of oil and water in said storage tank may be ascertained.

We wish it understood that the form of our invention herewith shown and described is to be taken as a preferred example of the same, and that certain changes in the shape, size and arrangement of parts may be resorted to without departing from the spirit of our invention or the scope of the subjoined claims.

Having thus fully described our invention what we claim as new and desire to secure by Letters Patent, is:—

1. In apparatus of the character described, a closed tank, a valve-casing disposed within the lower portion of said tank, a perforated pipe disposed within said tank and extending longitudinally thereof, said pipe having one end thereof connected with said valve-casing and the other end connected with the upper portion of said tank, a valve movably mounted within said valve-casing, a float connected with said valve, and a float-valve movably mounted within said perforated pipe to control the discharge of the same and to effect the movement of the first named valve.

2. In apparatus of the character described, a closed tank having its upper and lower ends provided with nipples, a valve-casing disposed within the lower portion of said tank and connected with one of the nipples, a valve to operate within said valve casing, a perforated pipe disposed longitudinally of said tank and having its ends connected with one of the nipples and valve-casing, a float-valve movably mounted within said perforated pipe to control the discharge from the upper end of the pipe and to effect the movement of the first named valve, supply means and discharge means disposed near the upper end of said tank and connected with the nipple, and discharge means and supply means disposed near the lower portion of said tank and having connection with the other nipple.

3. In apparatus of the character described, a closed tank having its ends provided with upper and lower screw threaded nipples, a valve-casing disposed within the lower portion of said tank and having connection with the lower nipple, a perforated pipe having its ends screw threaded for connection with the upper nipple and valve-casing, a valve movably mounted within said valve-casing and positioned near the lower end of said perforated pipe, and a float-valve movably mounted within said perforated pipe to control the discharge from the upper end of the same and to engage said valve upon its downward movement to effect the movement of the first named valve.

4. In apparatus of the character described, a closed tank, common supply and discharge means connected with the upper end of said tank, a perforated pipe extending longitudinally of said tank and having its upper end connected with said means, common supply and discharge means connected with the lower end of said tank, a valve casing disposed between the second named means and said perforated pipe and being connected with the same, a valve movably mounted within said valve casing, a float valve movably mounted within said perforated pipe, said float valve being adapted to control the discharge of material from the upper end of said perforated pipe and to move downwardly within said perforated pipe to actuate the first named valve, and a substantially vertically disposed pressure relief pipe having unobstructed communication with the lower end of said tank.

5. In apparatus of the character described, a closed tank, a valve-casing disposed within said tank, a pipe extending longitudinally within the tank above said valve casing and having one end thereof arranged adjacent the valve-casing, a valve movably mounted within the valve-casing to control the passage of fluids through the same, and a float-valve movably mounted within said pipe to control the discharge of fluids from one end of said pipe and to move downwardly within said pipe to effect the movement of the first named valve.

In testimony whereof we affix our signatures in presence of two witnesses.

JOHN G. ORTH.
WILLIAM WESTON.

Witnesses:
B. H. JOHNSON,
F. McD. SPENCER.